Aug. 6, 1929.  J. LAVOIE  1,723,561

COMBINED SADIRON AND HEATER

Filed Aug. 29, 1927  2 Sheets-Sheet 1

INVENTOR.
Joseph Lavoie
BY
Parker & Burton
ATTORNEY.

Aug. 6, 1929. J. LAVOIE 1,723,561
COMBINED SADIRON AND HEATER
Filed Aug. 29, 1927 2 Sheets-Sheet 2

INVENTOR.
Joseph Lavoie
BY Parker & Burton
ATTORNEY.

Patented Aug. 6, 1929.

1,723,561

UNITED STATES PATENT OFFICE.

JOSEPH LAVOIE, OF DETROIT, MICHIGAN, ASSIGNOR TO EZRA H. FRYE, TRUSTEE, OF DETROIT, MICHIGAN.

COMBINED SADIRON AND HEATER.

Application filed August 29, 1927. Serial No. 216,121.

My invention relates to an improved combined sad iron and heater wherein the heating element for the sad iron is removable from the sad iron shell to be used for heating, cooking or other purposes. Reference is hereby made to my Patents Nos. 1,491,147—1,580,909.

The present invention relates to an improved structure of the above general type wherein the heating element carries the handle which serves as a handle for the sad iron and wherein the construction of the sad iron shell and the heating element is such as to facilitate such an arrangement of parts and wherein the heating element and handle is provided with a shield which superimposes in spaced relationship the sad iron shell and wherein an improved adjustable connection is provided to releasably secure the heating element in place in the shell.

The above features and others will more fully appear from the following description, appended claims and accompanying drawing, in which:

Figure 1:
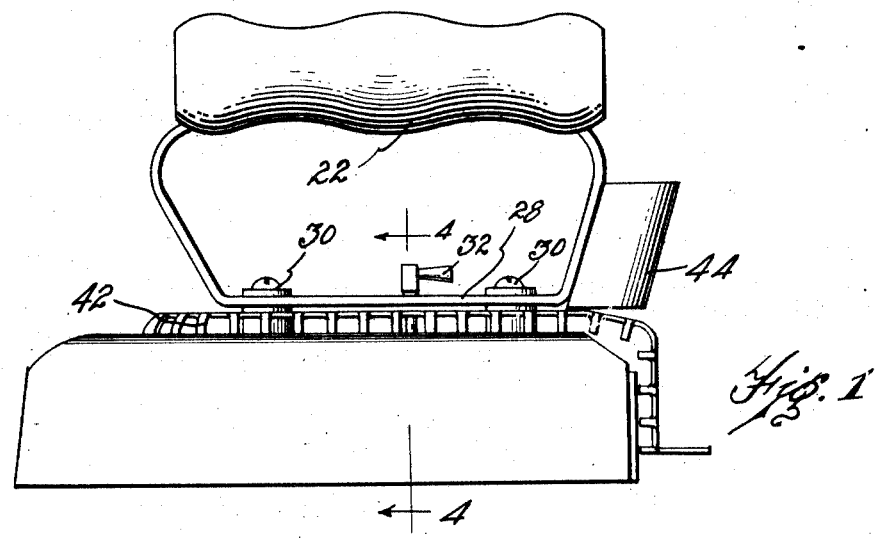
Fig. 1 is a side elevation of my combined iron and heater.
Figure 2:
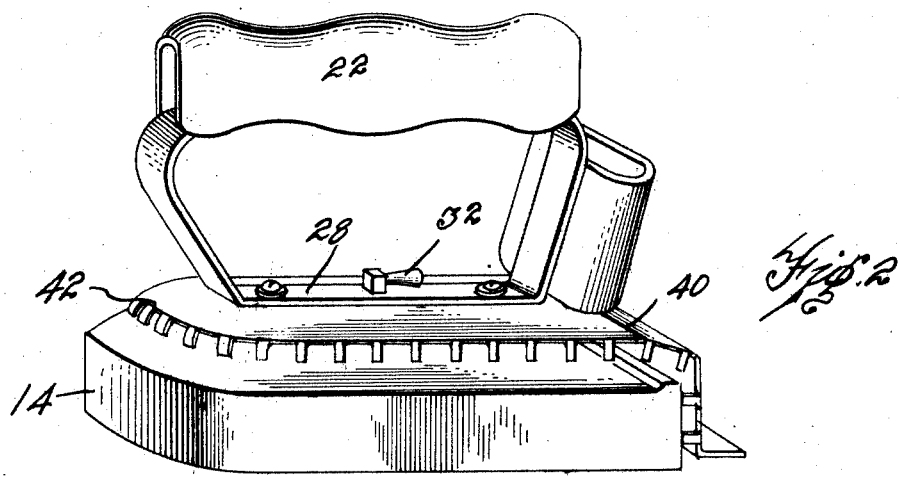
Fig. 2 is a perspective of the heating element removed from the iron.
Figure 3:
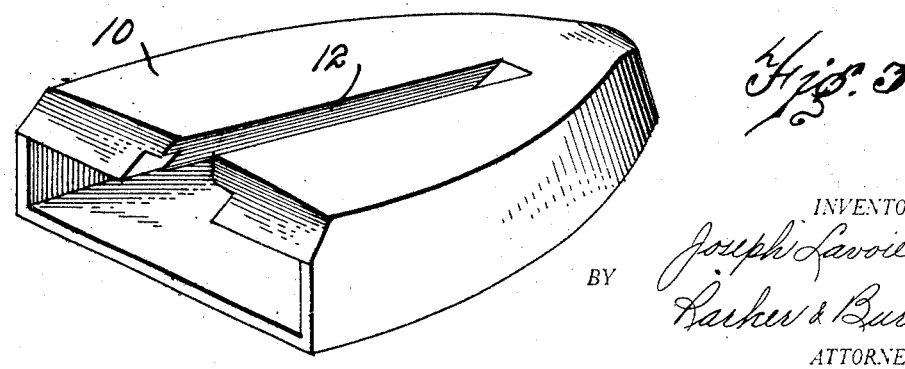
Fig. 3 is a perspective of the sad iron shell.
Figure 4:
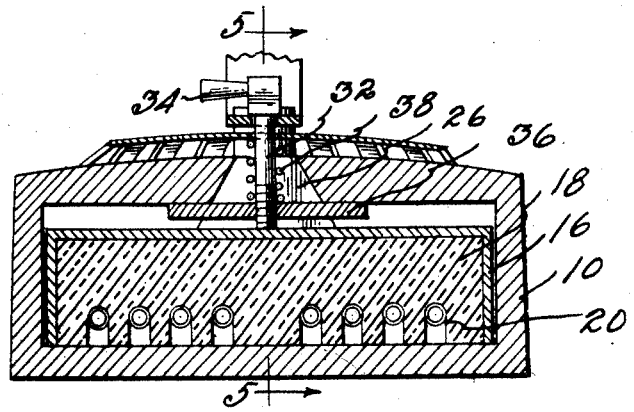
Fig. 4 is a cross-sectional view taken on line 4—4 of Fig. 1.

My invention comprises a hollow sad iron shell of generally triangular shape shown in Fig. 3 in perspective and indicated by the reference numeral 10. This shell is open at the broad end and is provided with a relatively narrow slot 12 extending therefrom toward the tip, which slot is tapered as shown in Fig. 4. There is provided a heating element 14 of generally triangular shape adapted to be bodily inserted into and removed from said shell through its broad open end. This heating element comprises a metal casing 16, a refractory insulating core 18 and suitable electric wiring 20 carried by the core.

Figure 5:
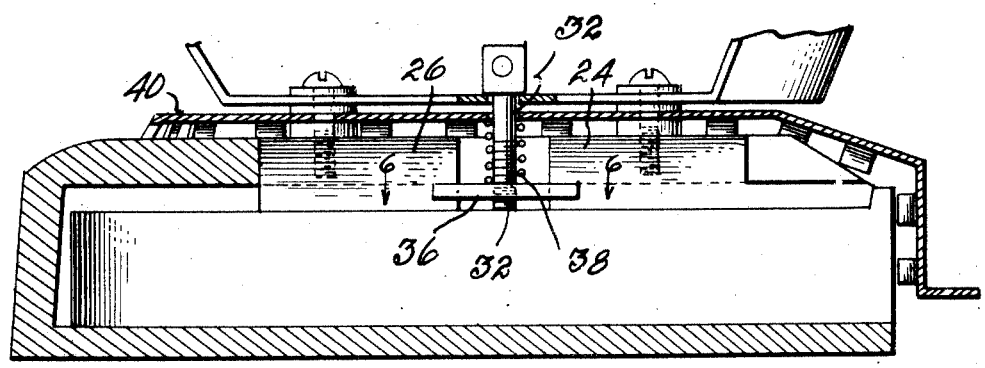
Fig. 5 is a cross-sectional view taken on line 5—5 of Fig. 4.

The heating element is provided with a handle 22 which also serves as the handle for the iron. This handle is mounted spaced above the heating element upon a pair of spaced apart linearly extending supports 24 and 26 which are tapered to correspond with the taper of the slot 12 in the shell and are receivable within said slot as shown in Figs. 4 and 5. The handle has a bridge portion 28 which is connected with these supports or lugs 24 and 26 in any suitable manner such as by screws 30.

To secure the heating element in place in the shell, I employ a screw member 32 provided with a handle 34 and carrying a plate 36 held in spaced relationship at the lower end of the screw by a spring 38.

Figure 6:
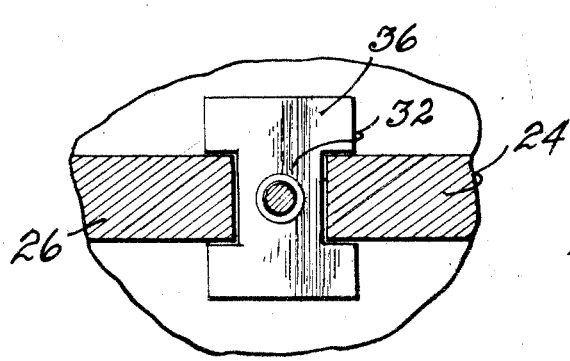
Fig. 6 is a fragmentary sectional view taken on line 6—6 of Fig. 5.

This plate is shaped as shown in Fig. 6 for disposal between the supports 24 and 26 and engaged therewith to prevent rotation of the plate. Rotation of the screw draws the plate upwardly to engage the shell on opposite sides of the slot to secure the heating element in place therein.

The heating element carries a shield 40 secured thereto in connection with the handle through the medium of the supports 24 and adapted to overlie the top of the iron shell. This shield has a ventilated downwardly-turned marginal portion 42 and is also bent downwardly over the open rear end of the shell.

There is a socket 44 secured to the handle which is adapted to receive an electric connection.

The device is capable of employment as a sad iron of the commonly known type and the heating element is adapted to be completely removed from the sad iron and may be supported upon one end by resting upon the base of the shell and the upper end of the socket for a heater or it may be placed upon a suitable stand to furnish the heating element of a cooking device.

What I claim is:

1. A sad iron comprising a hollow generally triangularly shaped shell having an opening at its broad end, the top of such shell being provided with a slot extending from said opening toward the tip, a heating element bodily receivable within said shell through said opening provided with handle supports slidably receivable through said slot upon insertion of the heating element into the shell, a handle carried by said supports and a shield carried by said supports spaced above the heating element to overlie the top of the shell when the heating element is positioned therein and concealing said slot.

2. A sad iron compresing a hollow shell of generally triangular shape having an opening at its broad end, the top of said shell being provided with a narrow slot extending from said opening toward its tip, an electric heating element bodily receivable within the shell through said opening provided with a handle support extending longitudinally thereof along its upper face, said handle support receivable within the slot in the shell, a handle carried by said support and fastening means carried by the handle having a part extending through the slot in the shell and engageable with the shell to secure the heating element in place therein.

3. A sad iron comprising a hollow shell of generally triangular shape having an opening at its broad end, the top of said shell being provided with a narrow slot extending from said opening toward its tip, an electric heating element bodily receivable within the shell through said opening provided with a handle support extending longitudinally thereof along its upper face, said handle support receivable within the slot in the shell when the heating element is positioned therein, a handle carried by said support and fastening means carried by the handle having a part extending through the slot in the shell and engageable with the under face of the top of the shell on opposite sides of said slot to secure the heating element in place within the shell.

4. A sad iron having a hollow sad iron shell of generally triangular shape open at its broad end and being provided with a slot extending through its top from said open end toward its tip, a heating element shaped to fit within said shell and bodily receivable through the open end of the shell, a pair of aligned spaced apart handle supports secured to the top of the heating element and extending longitudinally thereof and receivable through the slot in the shell upon the insertion of the heating element into the shell, a handle secured to said supports, a fastening screw carried by said handle disposed between said supports and receivable through the slot in the shell and a part operatively coupled with said screw to be urged thereby to engage the underside of the top of the shell upon opposite sides of said slot to secure the heating element within the shell.

5. A sad iron comprising a hollow sad iron shell of generally triangular shape open at its broad end and provided with a narrow slot extending through the top of the shell from its open end toward its tip and tapering from the under surface of the top of the shell toward the top surface thereof, a heating element shaped to fit within said shell and bodily receivable therein through the open end of the shell, handle supports secured to the top of said heating element and tapered to be received through and fit within said slot, a handle secured to said supports and fastening means extending through the slot in the shell operable to secure the heating element within the shell.

In testimony whereof, I, JOSEPH LAVOIE, sign this specification.

JOSEPH LAVOIE.